Figure 1:
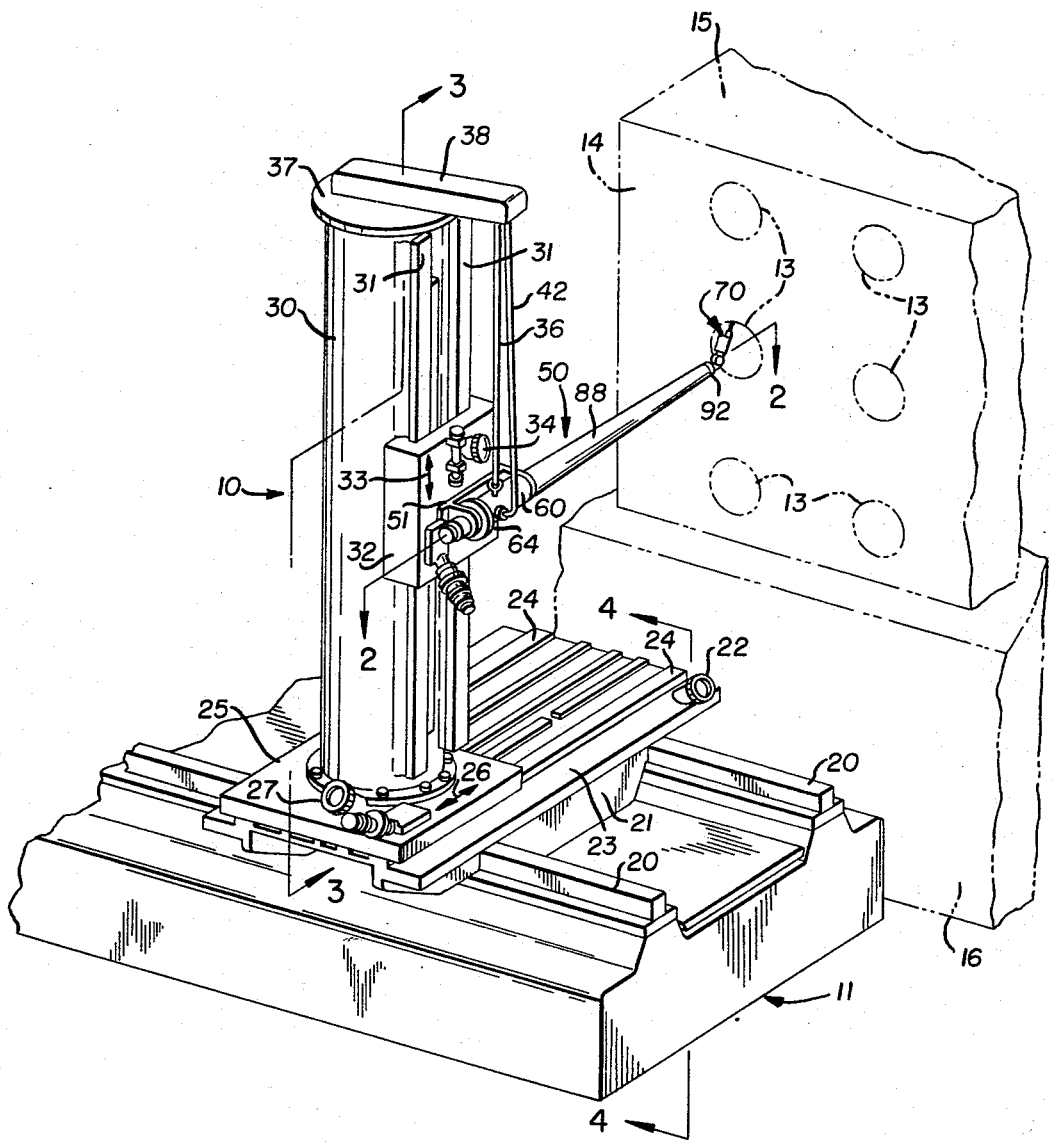

Oct. 18, 1966    F. S. SCHILER    3,279,079
INSPECTION MACHINE

Original Filed March 1, 1963    9 Sheets-Sheet 1

INVENTOR
FREDERICK S. SCHILER
BY
*J. William Freeman*

ATTORNEY

INVENTOR
FREDERICK S. SCHILER
BY
ATTORNEY

INVENTOR.
FREDERICK S. SCHILER
BY
ATTORNEY

Oct. 18, 1966  F. S. SCHILER  3,279,079
INSPECTION MACHINE
Original Filed March 1, 1963  9 Sheets-Sheet 4

INVENTOR
FREDERICK S. SCHILER
BY
ATTORNEY

Oct. 18, 1966    F. S. SCHILER    3,279,079
INSPECTION MACHINE
Original Filed March 1, 1963    9 Sheets-Sheet 5

INVENTOR.
FREDERICK S. SCHILER
BY
Llewellyn Freeman
ATTORNEY

Oct. 18, 1966  F. S. SCHILER  3,279,079
INSPECTION MACHINE
Original Filed March 1, 1963  9 Sheets-Sheet 8

INVENTOR
FREDERICK S. SCHILER
BY
*J. William Freeman*
ATTORNEY

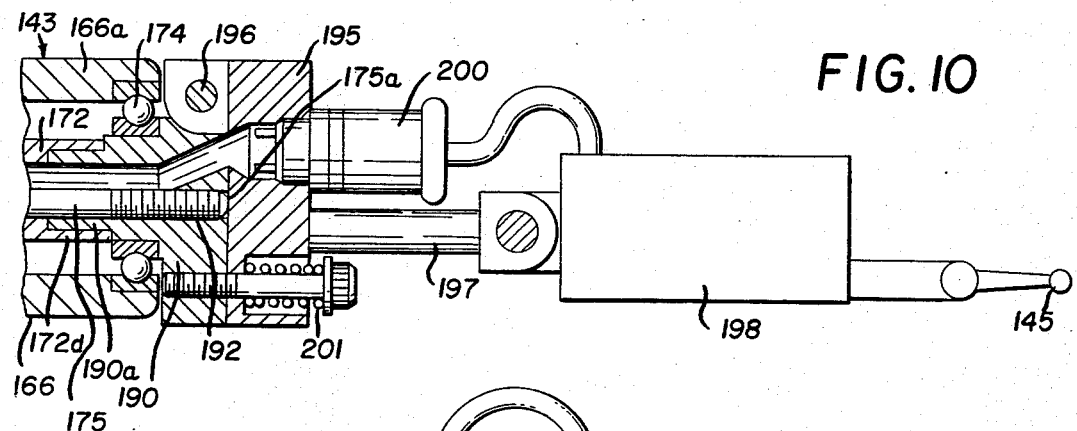
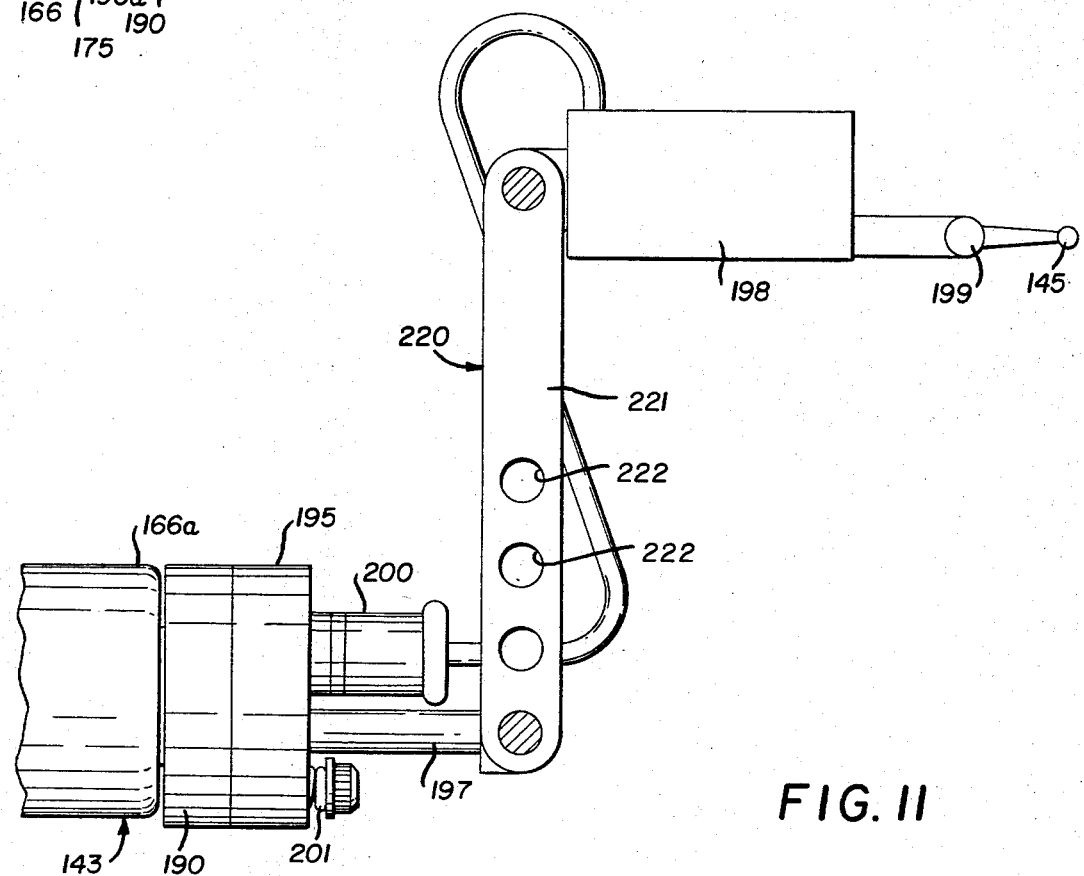

United States Patent Office 3,279,079
Patented Oct. 18, 1966

3,279,079
INSPECTION MACHINE
Frederick S. Schiler, Stow, Ohio, assignor to Portage Machine Company, Akron, Ohio, a corporation of Ohio
Continuation of application Ser. No. 261,973, Mar. 1, 1963. This application Oct. 22, 1965, Ser. No. 507,629
17 Claims. (Cl. 33—169)

This application is a continuation of applicant's earlier filed application identified as Serial No. 261,973 and filed March 1, 1963, and now abandoned.

This invention relates to the art of inspection machines and in particular relates to an improved type of inspection machine having increased accuracy of measurement by virtue of certain improvments provided for compensating for the sag that would otherwise occur in such machine.

Inspection equipment of various types has long been utilized in the machine tool industry for checking the accuracy of rough castings prior to machining of the same. Such equipment also has excellent utility in connection with the checking of final dimensions on machined products to determine the accuracy of the machining operations that have been performed thereon.

While inspection machines have been utilized for such purposes for some time past, the use of the same has nonetheless been to some extent limited because of the limited degree of accuracy that can be obtained by the use of such equipment as presently known.

Specifically, and in the instance of machining or checking the accuracy of a relatively deep bore that has been machined in a casting, for example, the inspection apparatus by necessity, must include an elongate arm that can be inserted into such bore as a probe and then rotated to check the accuracy of said bore with reference to a predetermined reference point.

Regardless of the rigidity built into such an inspection arm, it has been found that there will be a certain degree of sag present at its projecting end, with this sag dropping this end below the point of support for the arm that is normally provided in the opposite end of the probing arm. Accordingly, with this deflection occurring, it follows that there is inaccuracy of measurement that will occur, so that the use of the machine will be limited to an accuracy range that is less than the amount of sag existent in the inserted end of the inspection arm.

Further deflection and inaccuracy is often present by virtue of the manner in which the inspection arm per se is mounted on the upright support column for the same. Specifically, if the center of gravity of the arm is not mounted in the path of supported travel on the upright column, then and in that event, a deflection moment will occur that will increase in amount as the arm moves upwardly on the upright column, with the result that a considerable degree of deflection of the support column per se will occur when the inspection arm is at the upper end of its travel, for example. It is apparent that such deflection of the support column results in an equivalent deflection of the inspection arm to thus further limit the accuracy thereof.

It has been further found in connection with these machines that the utility of the same is to a degree limited by the inability to accurately determine the position of the inspection probe during the period that the arm is inserted into the bore being checked, for example.

It has been discovered that the aforementioned disadvantages can be obviated, in general, by mounting the inspection arm on the support column so that deflection sag thereof is compensated for in original mounting. Thus, the probe that rotates around the axis of the inspection arm at its projecting end, will always sweep through a perfectly vertical plane with respect to a horizontal surface for the work.

It has further been discovered that if the inspection arm is supported at its center of gravity for vertical movement as the upright support column, that then and in that event, there will be no moment created to deflect the arm out of the aforementioned true alignment regardless of the position of the arm on the upright support column.

It has further been discovered that if the remote end of the arm is provided with measuring and turning indicia that are mechanically connected to the probing end thereof, that exact measurements can be taken with regard to the position of the inspecting probe notwithstanding the fact that when the same is inserted into the bore being checked, it is inaccessible to the operator's view.

It has been further discovered that the use of the aforementioned improvement is not predicated upon a certain type of three dimensional actuating structure, but that various forms of supporting means for three dimensional measurement can be provided, while still incorporating the above features that result in improved accuracy.

Production of an improved inspection machine having the above advantages accordingly becomes the principal object of this invention, with other objects thereof becoming more apparent upon a reading of the following brief specification, considered and interpreted in the light of the accompanying drawings.

Figure 2:
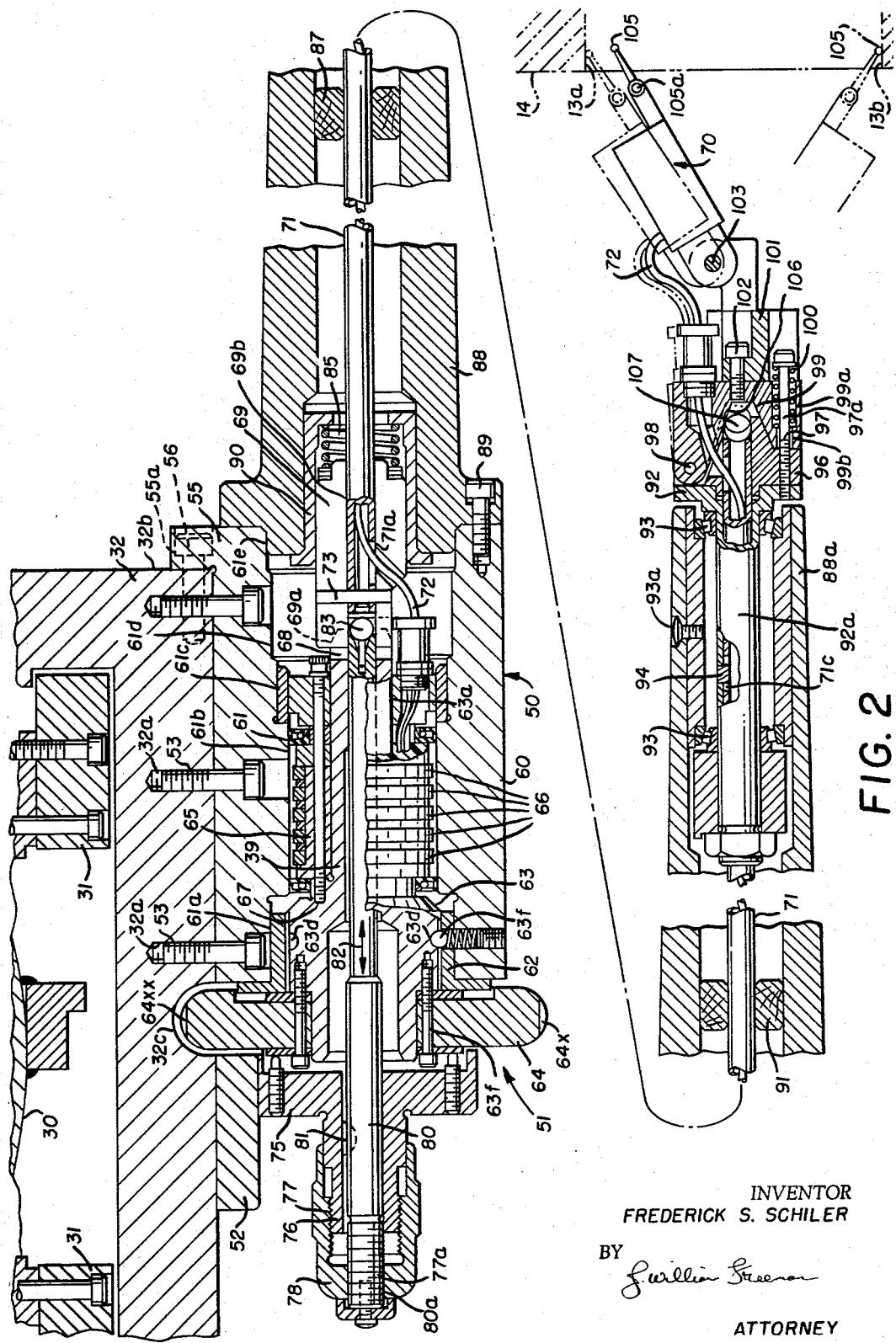
Figure 3:
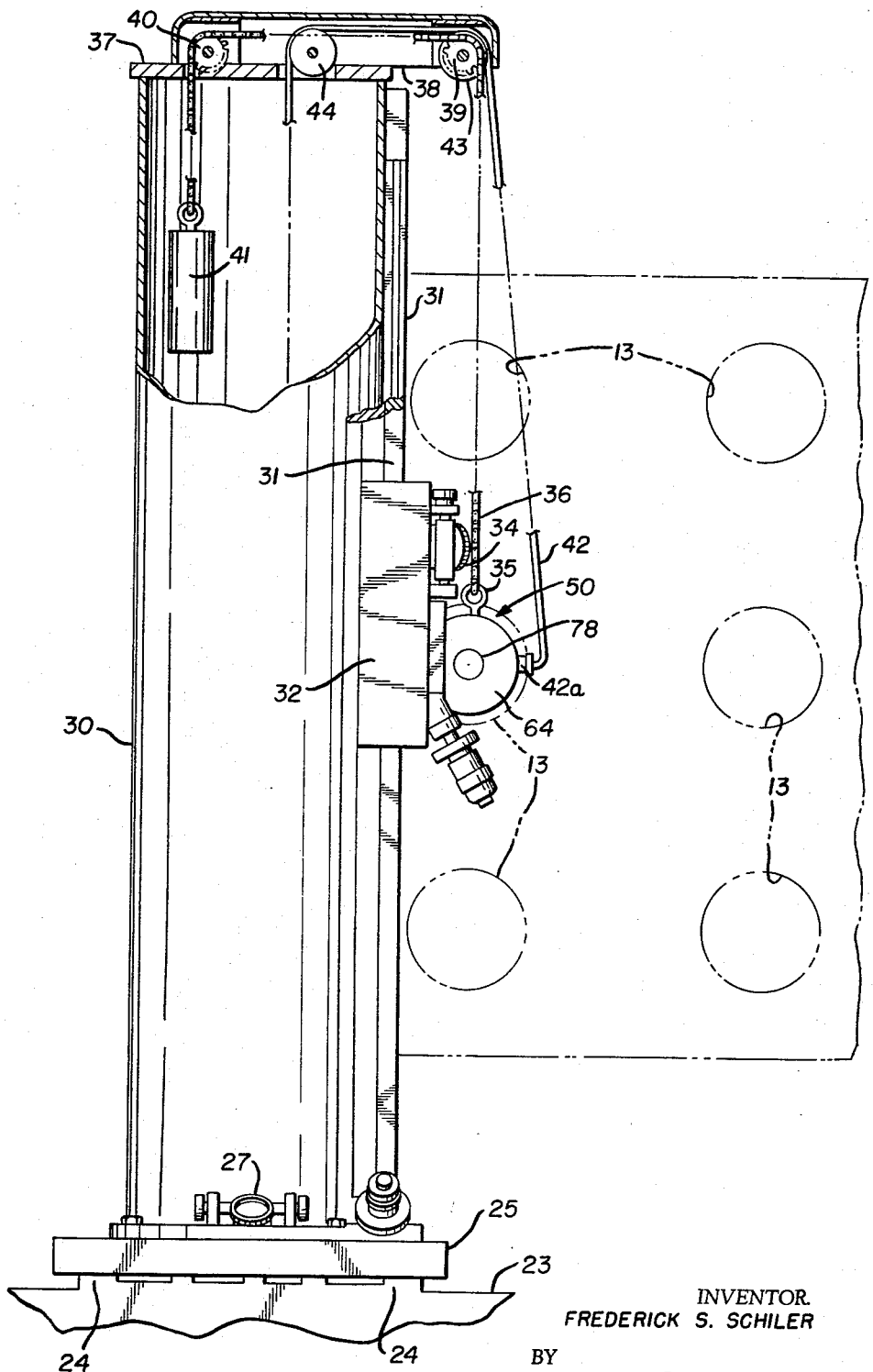
Figure 4:
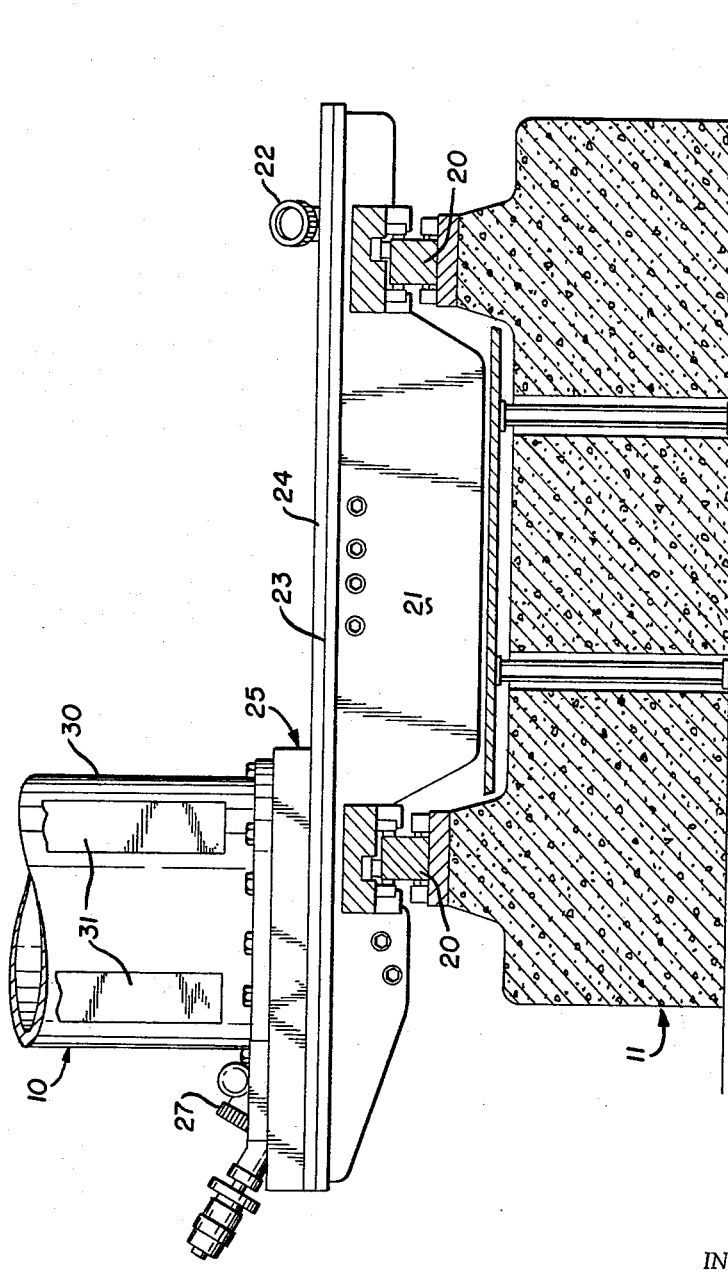
Figure 5:
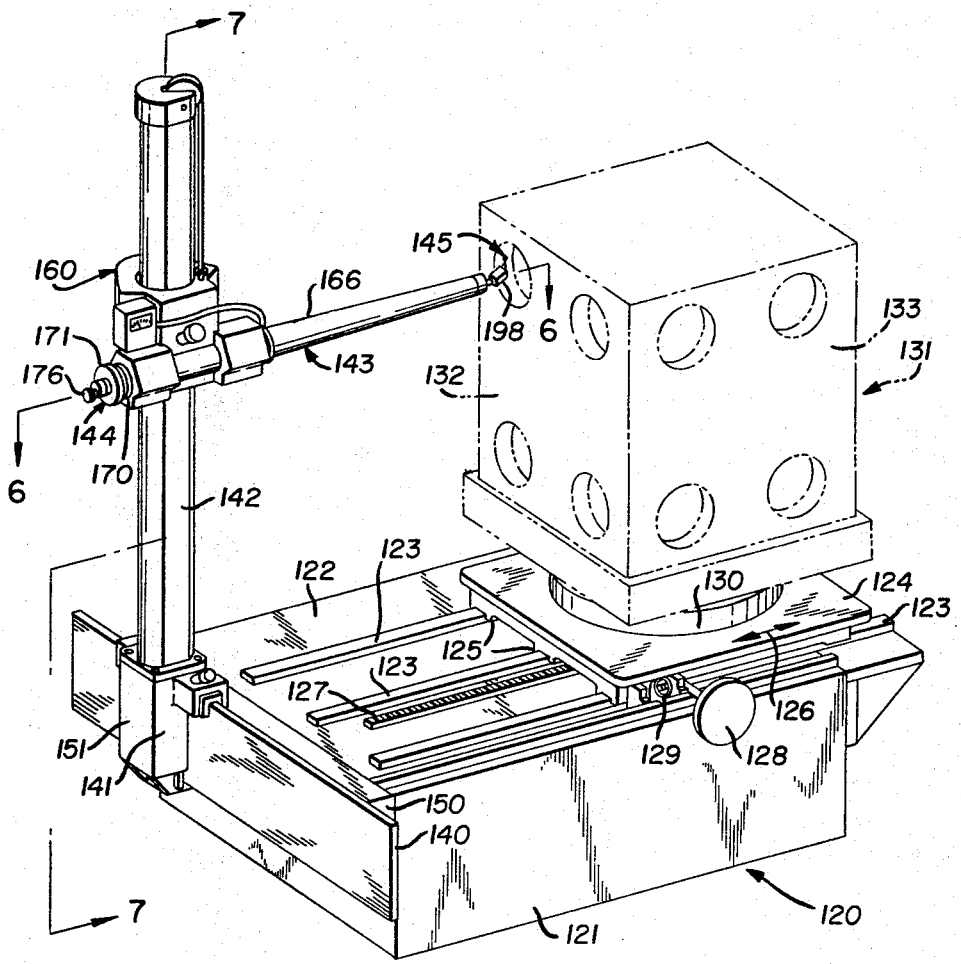
Figure 6:
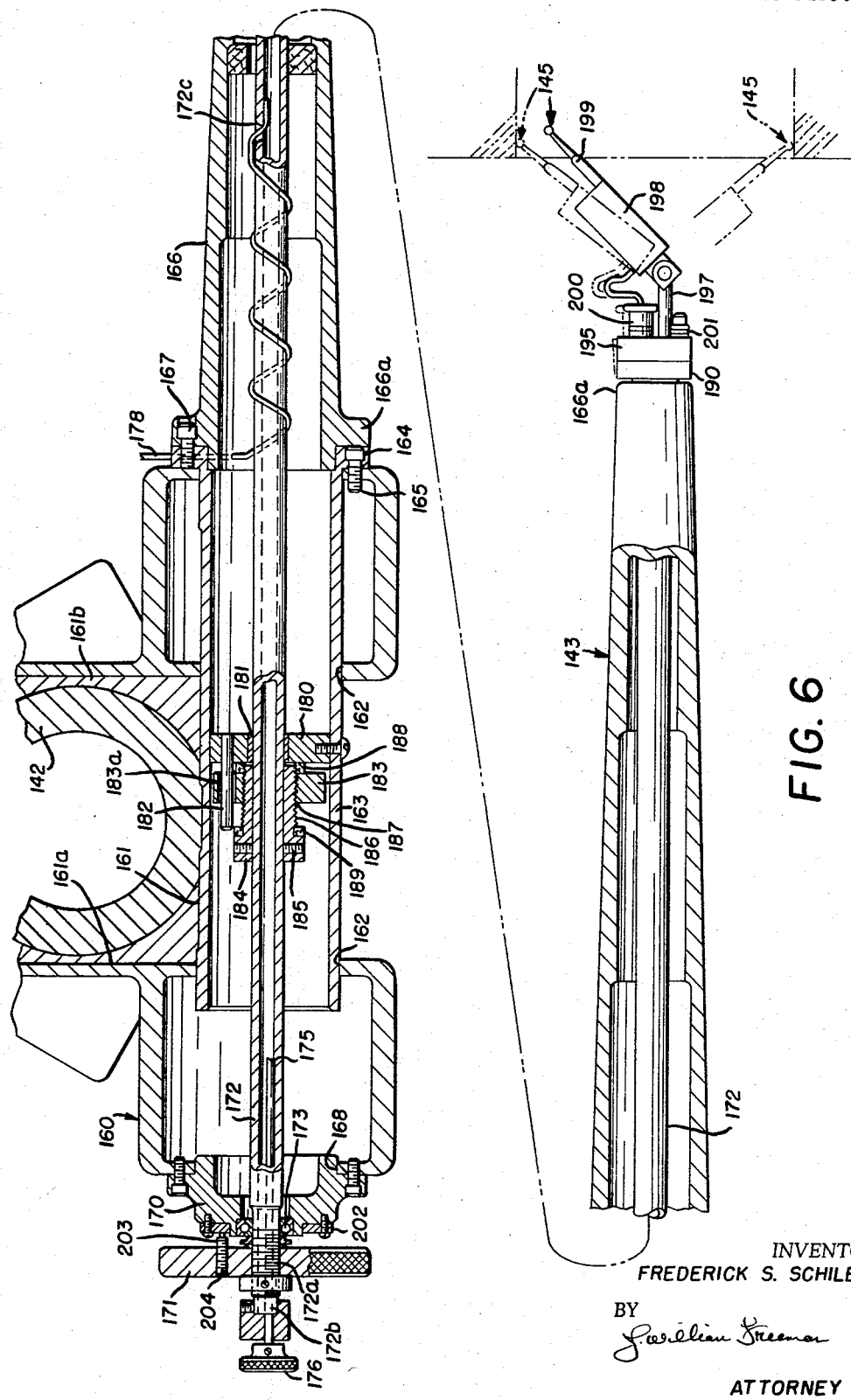
Figure 7:
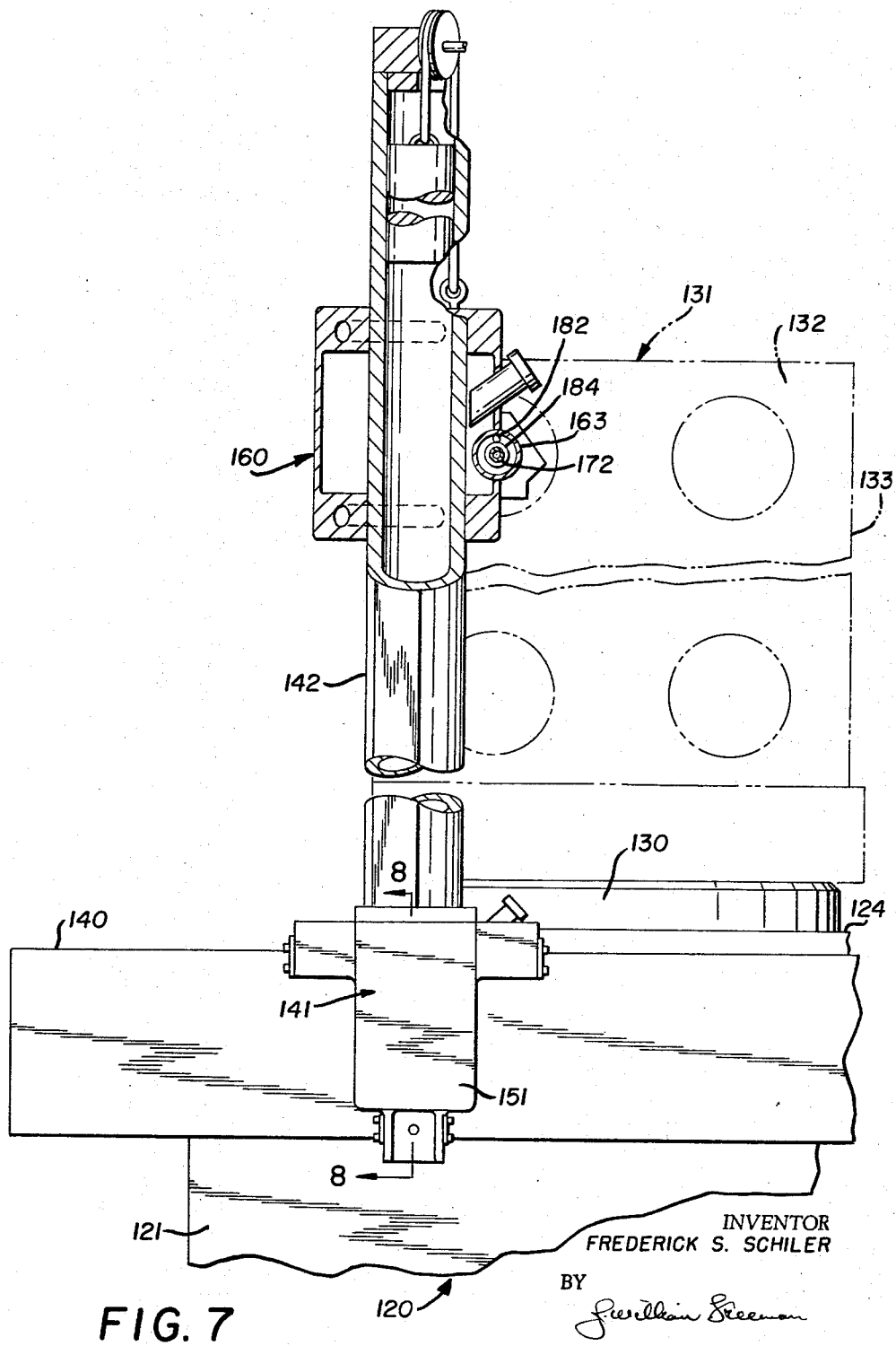
Figure 8:
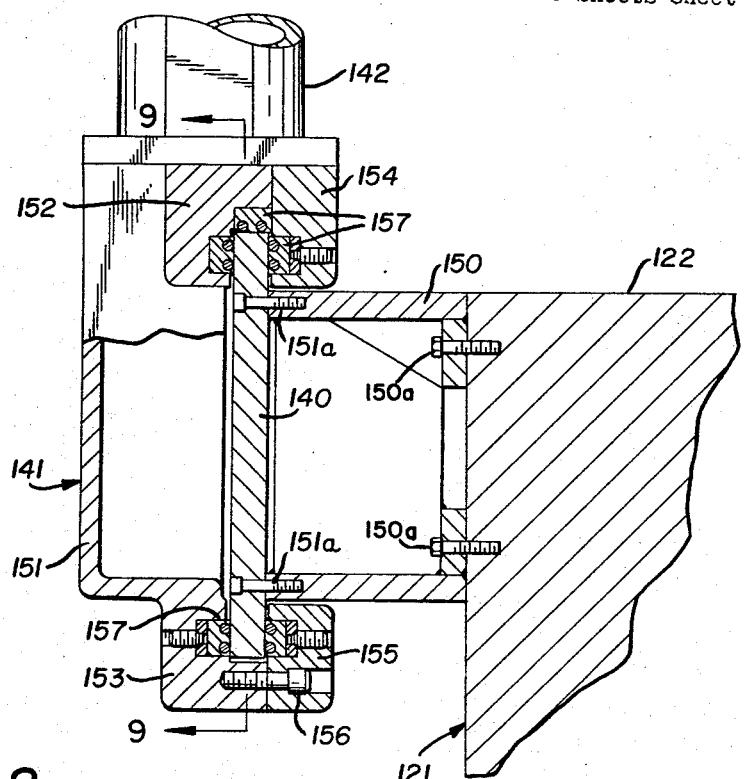
Figure 9:
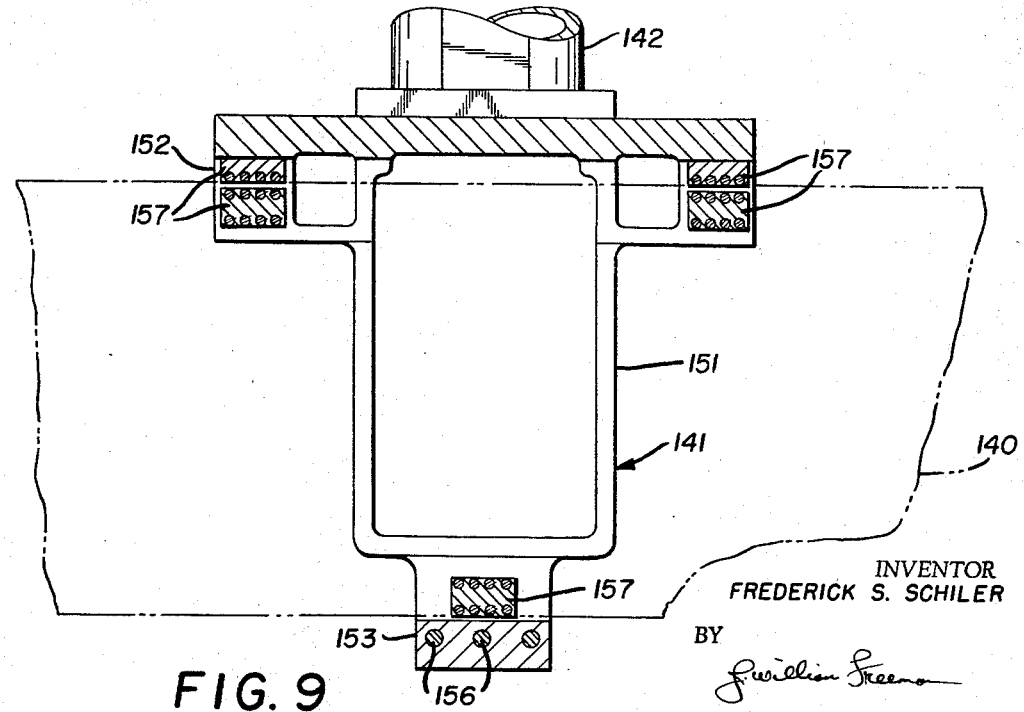

Of the drawings:
FIGURE 1 is a perspective view of the preferred form of the inspection machine.
FIGURES 2, 3 and 4 are sectional views taken on the lines 2—2, 3—3, and 4—4 of FIGURE 1 and showing the details of construction of the improved inspection machine.
FIGURE 5 is a perspective view of a modified form of inspection machine.
FIGURES 6 and 7 are sectional views taken on lines 6—6 and 7—7 of FIGURE 5.
FIGURE 8 is a vertical section taken on the lines 8—8 of FIGURE 7.
FIGURE 9 is a vertical section taken on the lines 9—9 of FIGURE 8.
FIGURE 10 is an elevational view showing the mounting of contact means shown in FIGURES 5 through 8.
FIGURE 11 is an elevational view similar to FIGURE 10 but showing a modified form of contact members.

Referring now to the drawings and in particular to FIGURE 1 thereof, the improved inspection machine, generally designated by the numeral 10, is shown shiftably presented with respect to a support base 11 so that the contact means 70 thereof that are provided on the projecting end of an inspection arm 50 can be utilized to inspect the bores 13—13 that extend inwardly from face 14 of a casting 15, with the casting 15 being shown supported on a surface table 16 that is preferably disposed in a horizontal plane as shown in FIGURE 1.

Considering the structure of the base 11 first, it will be noted that the same is provided with parallel ways 20—20 upon which a cross-slide unit 21 may be mounted, with indicator scope 22 of cross-slide 21 indicating the amount of travel of slide 21 relatively of ways 20—20. The cross-slide 21 further includes an upper face 23 that is provided with parallel ways 24—24 that are disposed at right angles to the ways 20—20 so as to permit the appropriately shaped base 25 to reciprocate in the direction shown by arrow 26, and with the amount of relative movement between base 25 and slide 21 being determined by measuring scope 27. Mounted upon the just described base 25 is an upright column 30 that is generally of circular configuration, with the cross section configuration being best illustrated in FIGURES 2 and 3 of the drawings. In this regard, FIGURE 2 indicates that the column 30 is contoured to support vertical ways 31, 31 upon which a support bracket 32 may be slidably supported, with the direction of reciprocatory movement of the bracket 32 being indicated by the arrow 33 of FIGURE 1 of the drawings. Again, the measuring scope 34 indicates the amount of travel of bracket 32 relatively of column 30.

It has been previously indicated that the method of supporting the inspection arm 50 for reciprocatory movement with respect to column 30 is of extreme importance and accordingly, and referring to FIGURE 3, it will be noted that a hook 35 is provided in the housing of the arm 50 at an appropriately located position so that the chain 36 attached to the hook 35 is, in effect, supporting the arm 50 around its center of gravity both with respect to the longitudinal and transverse dimensions thereof.

Stated otherwise, if the arm 50 and the bracket 32 were free of the column 30 and the way 31 thereof, the arm 50 would still hang in a perfectly horizontal plane upon being suspended by the chain 36 fastened to hook 35. In this way, no deflecting moment will be created on column 30 by the arm 50 regardless of its position on the column 30.

To the end of achieving such support the column 30 has a plate 37 provided over its upper end, with this plate 37 having secured thereto a support arm 38 that supports sprockets 39 and 40 about which the chain 36 may be played as clearly shown in FIGURE 3, with the remaining end of chain 36 being secured to an appropriate counterweight 41 so as to facilitate easy shifting of the arm 50 with respect to column 30.

To the end of supplying electrical current to the inspection arm 50 for purposes to be described, the housing of the arm 50 is further provided with a fitting 42a that receives an electrical supply cord 42 that is played around pulleys 43 and 44 so as to have the internal end thereof concealed within the column 30 as is clearly shown in FIGURE 3.

In this way, electrical current of the type required for operation of the inspection arm as will be described can be provided notwithstanding the shifting movement that occurs between the inspection arm 50 and the column 30.

Turning now to FIGURE 2 for an examination of the detailed structure of the elongate arm previously generally indicated by the numeral 50, it will be noted that the same first includes a main support casting 51 (FIGURE 1) and a flat pad like portion 52 (FIGURE 2) that is designed to permit reception of the pad 52 against the bracket 32 with bolts 53—53 being secured in tapped apertures 32a, 32a as clearly shown in FIGURE 2 of the drawings. In this fashion, the pads 32 and 52 and the bracket 51 will move in unison relatively of way 31 to permit raising or lowering of arm 50 with respect to column 30.

One of the most salient features of the invention has been indicated as relating to the adjustable mounting of the arm 50 with respect to the support bracket 32 and to this end, the pad 52 is shown provided with an integral lip portion 55 that is designed to be disposed adjacent the edge 32b of bracket 32, with lip 55 being bored, as at 55a, to receive adjustment bolts 56 that will bear against the surface 32b as clearly shown in FIGURE 2 of the drawings. Preferably, an upper and lower adjustment bolt arrangement of the type just described is provided, and it will be seen that by backing off the upper such adjustment nut 56 and advancing the projecting end of the lower bolt 56, that the projecting end of the arm 50 will be slightly raised to compensate for the sag that would otherwise occur because of the weight moment that exists at the projecting end.

In this regard, the fit or tolerance of the bolts 53, 53 within the tapped aperture 32a—32a, is preferably such that a limited amount of such adjustment as just described can occur, with it normally being necessary to make an adjustment of only a few thousandths of an inch to compensate for the sag that would otherwise occur.

The main housing unit 51 further includes a cylindrical extension 60 that surrounds the rotating mechanism for the contact means 70. Accordingly, and referring to FIGURE 2, this housing 60 is shown including a central axial bore 61 that is provided with concentric cylindrical surfaces 61a, 61b, 61c, 61d and 61e, with the surface 61a receiving a bushing 62 within which is journaled a drive sleeve 63, with sleeve 63 being connected by bolts 63f, 63f, to handle 64 so as to be rotatable therewith, with it being noted that a recess 32c is provided on the plate 32 for receiving the peripheral edge of the handle 64 as shown in FIGURE 2.

The central axial bore 61 is preferably contoured in known fashion to support a series of commutator brushes (not shown), that cooperate, in the usual manner, with a like number of commutator rings 66, 66, that are provided on an insulating sleeve 65 that is retained in place on the reduced diameter portion 63a of drive sleeve 63 by bolts 67, 67 as clearly shown in FIGURE 2 of the drawings.

Adjacent the outboard end, the driving sleeve portion 63 is contoured to define a driving tongue 68, with this tongue 68 being slidably received within the appropriate groove 69a of a driven block 69, with the block 69 further having an axial bore 69b within which a thin elongate tube 71 may be received as shown in FIGURE 2 of the drawings.

In this regard, the tube 71 is provided with an opening 71a to receive an electric cord 72 that connects the commutator brushes with the extreme projecting end of the contact means 70 as will be subsequently described. The tube 71 and the driven block 69 are intended to rotate in unison and in this end, a pin 73 is provided for the purpose of interconnecting these just described components as shown in FIGURE 2.

While the aforementioned tongue and groove arrangement is provided for the purpose of transmitting rotational movement of member 63 to tube 71, it is also intended that the rod 71 should move axially with respect to the drive sleeve 63 and accordingly, and referring to the left hand portion of FIGURE 2, it will be noted that adjustment means are provided for this purpose.

The adjustment means so provided include an adjustment housing 75 that is shown fixed with respect to the pad 52 so as to serve as a point of support for the axial adjustment means that will now be described. In this regard, the adjustment housing 75 includes a sleeve like projection 76 that is threaded, as at 77, for engagement with a turning cap 78, with the turning cap 78 having threads 77a provided in a central bore thereof and with these threads 77a engaging the threaded portion 80a of a shifting rod 80 as shown in FIGURE 2. The rod 80 is fixed against rotation relatively of the sleeve 76 by a spline 81, and in this fashion, rotation of the turning cap 78 will result in reciprocatory movement of shaft 80 in the direction of the arrow 82 in FIGURE 2, with such axial movement occurring relatively of sleeve 63 by virtue of rod 80 being loosely received in bore 63g thereof.

This just described axial movement of rod 80 relatively of sleeve 63 will accordingly result in equivalent axial movement of the ball 83 that is provided on the projecting end of the shaft 80, and in this regard, it is to be noted that these increments of axial movement are capable of fine measurement due to the fact that the threads 77 and 80a are of a different pitch so as to provide a differential movement that accordingly permits extreme fine adjustment with regard to the axial movement of the shifting rod 80.

As indicated above, the just described reciprocatory movement of rod 80 will also result in movement of the block 69 against the force of the back-up spring 85, with block 69 moving by virtue of its connection to tube 71 through pin 73.

In the extreme right hand portion of the upper view shown in FIGURE 2, a bearing unit 87 is shown surrounding shaft 71 with this bushing 87 serving to concentrically arrange the shaft 71 with respect to the arm housing 88 that is bolted to the cylindrical portion 60 by bolts 89, 89 as shown in FIGURE 2. A sleeve bushing 90 is interpositioned preferably between the arm housing 88 and the driven block 69 so that the block 69 may be rotated concentrically with respect to the housing 88. Turning now to the lower portion of FIGURE 2, it will be noted that an additional bushing 91 surrounds the tube 71 at a further outboard portion and in this regard, it is to be understood that as many of these bushings can be provided as are required to insure concentricity of the just described component parts.

Proceeding further to the right of the lower view of FIGURE 2, it will be noted that the projecting end of the tube 71 is telescoped within a spindle 92, with the tubular portion 92a of spindle 92 being connected to tube 71 by key 94, so as to be rotatably driven by the tube 71, with concentricity between spindle 92, tube 71 and sleeve portion 88a, being insured by bearings 93, 93 that serve to mount the described component parts in connected relationship within the extreme outboard end 88a of the arm housing 88 as shown in FIGURE 2. Thus, and referring to FIGURE 2, the spindle 92 will rotate in unison with the tube 71, but will not shift relatively axially of the arm housing 88a due to the provision of the just described bearings as well as the bolt 93a that locks the spindle 92 against such axial shifting relatively of housing 88a. However, relative axial movement between spindle 92 and tube 71 can occur by reason of the slot 71c that is provided in the tube 71 for reception of the drive key 94.

A mounting head 96 is secured to the drive spindle 92 by bolts 97, 97, and preferably this mounting head 96 is contoured to receive the extreme outer end of the tube 71 in axially shiftable relationship therewith, so as to permit shifting of the contact means 70 between the full and chain dotted positions shown in FIGURE 2 of the drawings.

Further, and for the purpose of permitting such shifting of member 70, the mounting head 96 includes a pivot support 98 upon which the carrier block 99 may be pivotally mounted with carrier block 99 supporting contact element 70 as shown.

To this end, the carrier block 99 includes a recess 99a and slot 99b within which the shank portion 97a and the threaded portion of the bolt 97 may be respectively received, with spring 100 normally bearing against the interior end of the recess 99a and the head of the bolt 97 to urge the carrier block 99 to the full line position of FIGURE 2. An auxiliary arm carrier 101 is bolted to the carrier block 99 by bolt 102, and this arm carrier 101 has a pivot 103 about which the contact arm, generally indicated by the numeral 70, may be pivotally mounted. Further, the actual contact element 105 that is provided, is preferably projecting in pivotal relationship to member 70, with such pivoting being around pivot 105a and with current from the wire 72, being transmitted to member 70 as shown in the extreme right hand portion of FIGURE 2.

While the operating characteristics of the member 70 have been set forth above, it is also to be noted that the member 70 is intended to accurately measure deflections of the tip portion 105 that occur upon encountering of a surface that causes the entire unit 70 to shift about its point of pivotal support. In this regard, the instrument 70 is provided with an amplifier (not shown) that measures the amount of deflection occurring and gives a scale reading with respect to the same. Electronic instruments are known in the art and any one of several known instruments of this type can be used at the probing end of applicant's inspection arm.

It will be noted further in this regard that the carrier block 99 has a force-receiving surface 106 that is contacted by the ball 107, with shifting movement of the ball 107 between the full and chain dotted line position of FIGURE 2 serving to move the contact element 70 between the full and chain-dotted lines of FIGURE 2 by virtue of the pivoting of carrier 99 around pivot 98.

A further salient feature of the invention exists with reference to the means that indicate the position of the probe 70 when the same is inserted into a bore so as to be inaccessible to the operator's view. Preferably, in this regard, the turning handle 64 shown in FIGURES 1 and 2 is provided with a series of flatted surfaces 64x, 64x on its peripheral edge, with these flatted surfaces being arranged at right angles to each other so as to divide the handle 64 into four 90 degree quadrants. Preferably, the surface that corresponds in location to the projecting position of the probe 70 is marked with a different color and in this regard, in FIGURE 2, the surface 64xx is disposed in the same relationship to the center line as is the contact member 70 so that in this instance, the surface 64xx would be marked with a distinguishing color.

Further, in this regard, it is preferable that a similar set of notches 63d, 63d be provided on sleeve 63 at 90 degree spacing from each other, with spring loaded detent 63f being selectively engageable with any one such notch and with the notches 63d, 63d preferably being aligned with flats 64x, 64x for measurement purposes.

In use or operation of the improved device, it will be further assumed that the component parts have been assembled to the position indicated in the drawings and further that a work piece 15 is in position on surface 16. Further, it will be assumed that the face 14 of work piece 15 is disposed at right angles with respect to (1) the work surface 16, and (2) the direction of travel indicated by the numeral 26 in FIGURE 1.

At this point, and with the component parts positioned as shown in FIGURE 1, the probing means 70 may be first set to the approximate diameter of the bore in question, followed by insertion of the arm 50 into the bore by moving the base 25 along the ways 24, 24 in the direction of arrow 26. When the appropriate degree of penetration has been reached, the position of the bore may be checked as follows.

First, the operator will rotate the handle 64 until one notch 63d has been engaged by the ball detent 63f. At this time, and because of the fact that the element 105 has been preset in the approximate radial spacing prior to insertion of the arm 50 as provided, the entire unit will be shifted transversely along the ways 20. At this time, it will be assumed that the unit 70 is in a horizontally disposed position as shown in FIGURE 2 and accordingly the entire unit 10 will merely be shifted slightly to the left of the ways 20 until contact is made with the bored surface 13a as shown in FIGURE 2.

Following initial contact with the surface 13a as just described, the unit will be shifted until a maximum deflection reading is achieved on the amplifier scale (not shown). The probing unit will then be rotated 180 degrees to contact the surface 13b as shown in chain-dotted lines in FIGURE 2, and at this time, a second reading will be taken on the amplifier scale.

The difference between the first and second readings will represent twice the distance that the inspection unit is off center, and accordingly, the actual difference in the respective scale readings is divided by two and the machine reset by this difference, so that the amplifier unit will read zero when contact is made with the surfaces 13a and 13b. At this time, the operator need merely rotate the probing unit 90 degrees and shift the machine vertically until a zero reading is obtained on the amplifier. At this time, the true center of the bore in question is established.

When the center line of the bore just described has been established, appropriate readings can now be taken on the scopes 22, 27 and 34, following which the arm 50 may be removed. At that time and assuming the bores in question to be exactly five inches apart on center, the accuracy of location of the remaining bores can be easily and readily checked by merely moving the probing head five inches either vertically or horizontally as is required.

It will be noted that during such insertion after measured movement, the accuracy of any bore can also be checked throughout its entire length due to the fact that the center line thereof has been established. In the event that an inaccuracy is encountered in any bore, the degree of such inaccuracy can be readily ascertained by reading of the amplifier where an accurate reflection of this change will be indicated as previously described.

The modified form of the invention shown in FIGURES 5 through 10 of the drawings shows a simplified form of inspection arm that nonetheless is provided with sag compensation features of the type previously discussed. Additionally, the modification of the invention shown in FIGURES 5 through 10 shows how the principle of compensating for sag in the inspection arm may be utilized with a different type of supporting means for obtaining three dimensional movement.

Accordingly, and referring to FIGURE 5, the modified inspection machine, generally designated by the numeral 120, includes a base 121 having an upper surface 122 upon which a plurality of gideways 123, 123 may be provided. A work supporting block 124 has cooperative rails 125, 125 provided on the underface thereof for cooperative reception with the just described rails to thus permit reciprocal movement of the member 124 in the direction of the arrow 126. To impart such movement, a rack 127 is provided for cooperation with a pinion (not shown) that is operated by handle 128 so as to initiate the movement of the member 124 as just described, with scope 129 measuring the extent of such travel.

Additionally, a rotary table 130 is preferably provided on the work support member 124 for the purpose of rotatably supporting the work piece 131, with the rotary table permitting 90 degree indexing of the work so as to successively permit examination and inspection of the bores present in faces 132 and 133, with such bores being at right angles to each other.

One end of the base 121 is further provided with a rigid guide rail 140 upon which a base support member 141 may be slidably supported for reciprocation transversely with respect to the top surface 122. An upright column 142 projects upwardly from the just described base 141 and supports an inspection arm 143 that is shiftably positioned on column 142 as shown in FIGURE 5, with the inspection arm 143 having an actuating element 144 and a probing element 145 at its opposed ends as clearly indicated in FIGURE 5.

Referring now to FIGURES 7, 8 and 9 for a detailed description of the manner in which the base 141 is shiftably supported on the rail member 140, it will be noted first from FIGURE 8, that the rail 140 is positioned in spaced relationship to the base 121 by a support frame 150 that is secured, as by bolts 150a—150a, to the appropriate face 121a of the base 121, with a second set of bolts 151a, 151a securing rail 140 to frame 150.

The base support member 141 preferably includes a casting 151 that has upper and lower support edges indicated specifically by the numerals 152 and 153 in FIGURE 8 of the drawings, with a cover plate 154 being secured to the support edge 152 by bolts (not shown), while a similar cover plate 155 is secured to the lower support edge 153 by bolts 156, 156 for example. In this fashion, a plurality of bearing elements 157, 157 can be supported by the just described members to insure that the base 141 will slide smoothly across the rail member 140 for reciprocating transverse movement thereacross, with the usual stops or other travel limiting devices, being employed at appropriate points.

Turning now to FIGURE 6 for a description of the elongate inspection arm 143, it will be first noted that the upright column 142 is of generally circular cross-sectional configuration so as to facilitate encirclement thereof by a mounting hub 160, with hub 160 being provided with appropriate ways 161, 161a and 161b for engagement with the equivalent contoured surfaces of the column member 142.

The just described mounting hub 160 is shown preferably of U-shaped configuration in plan and is accordingly provided with appropriate bores 162, 162 in the opposed arms thereof so as to permit reception of a sleeve member 163, with sleeve member 163 having a radial flange 164 that is attached to one such arm as by bolts 165, 165. The arm 143 further has a tapering sleeve 166 that extends outwardly toward the probing element 145 with the sleeve 166 having a radial flange 166a that is attached to the flange 164 by a plurality of bolts 167, 167. In this regard, sag that would otherwise occur at the projecting end of arm 143, can be compensated for by placing shims of appropriate thickness between either face of flange 164 and the surface that would otherwise abut the same.

The remaining leg of the member 160 is bored, as at 168, to receive a mounting hub 170 within which may be received a rotating tube 172, with this tube 172 serving to rotate the probe 145 around the axis of the arm 143, with bearings 173, 174 (FIGURE 10) facilitating such rotational movement of tube 172.

To effectuate such rotational movement, a turning handle 171 is shown fixed with respect to a threaded portion 172a of the tube 172 by set screws (not shown), so that rotation of the handle 171 will result in an equivalent rotation of the tube 172 and the probe elements that are attached to the probing end thereof as will subsequently be described.

To achieve rigidity in the arm 143, the tube 172 is mounted to serve as an axle under axial tension, with the outer end thereof being threaded into the probing element as will be described, while tension is applied by collar 173 that threadingly engages threads 172 to thus be capable of moving the handle 171 to the right to place the tube 172 under axial tension, with movement of handle 171 being limited by stop screws 204, 204 that bear against plate 202 for this purpose. A bearing 173 journals the tube 172 for rotational movement with respect to hub 170 as shown in FIGURE 6.

In order that the probing element may be adjusted radially with respect to the center of the inspection arm 143, the tube 172 is further shown as receiving an actuating rod 175 that is threaded within the extension 172b of the tube so that rotation of the handle 176 results in axial shifting of the rod 175 relatively of the tube 172. An electrical supply line 178 is shown wrapped around the exterior of the tube 172 and is received internally thereof through an opening 172c provided at the right hand end of the portion of FIGURE 2.

To limit the extent of rotational movement of the tube 174 and thus avoid breakage of the just described wire 178 by winding the same too tight, the sleeve 163 has a plate 180 fixed thereto, with this plate 180 having a bushing 181 that rotatably receives the outer surface of the tube 172, with the plate 180 further having a projecting pin 182 that passes through an appropriate opening 183a of a nut member 183.

A sleeve 184 is fixed around tube 172 by screw 185 and further has threads 186 that matingly engage the threads 187 of the nut 183. In this fashion, rotation of the tube 172 will result in movement of the nut between the stops 188 and 189 so as to limit the extent of rotational movement that can thus be imparted to the tube 172.

Referring now to FIGURE 10, a spindle 190 is shown having a reduced diameter portion 190a telescoped within an appropriate undercut portion 172d of the tube member 172 with the ball bearings 174, 174 concentrically supporting both the spindle 190 and the tube 172 with respect to the projecting end 166a of the tapering housing, and with members 172 and 190 being fixed against relative axial movement as shown in FIGURE 10. The spindle 190 further has a threaded bore 192a within which the threaded end 175a of the actuating shaft may be received. A carrier block 195 is pivotally mounted to the spindle 190 by engagement thereof with the pivotal support 196 that is provided on the spindle 190.

The probing element per se is carried by a support arm 197 that projects from the front face of the carrier for this purpose, with the contact element 145 being pivoted, as at 199, to the probing member 198 and with the electrical connection being made through an appropriate fitting 200 that also projects from the forward face of the carrier member 195 as clearly shown in FIGURE 10.

In this fashion, rotation of the handle member 197 will cause the end 175a of the actuating rod 175 to bear against the rearwardly disposed face of the carrier member 195, and will thus cause the same to pivotally move to the chain dotted line position shown in FIGURE 6, for example, with the force of the springs 201 being overcome during this period as was previously the case in connection with FIGURES 1–4.

As a result of the aforesaid construction, in the event it is desired to rotate the probe in a sweeping circle, it is merely necessary that the handle 171 be rotated and if desired, in this regard, appropriate 90 degree spaced notches could optionally be provided in the contact plate 202 that is secured to the adjustment hub 170 as shown in FIGURE 6, with such an arrangement facilitating engagement of these notches by a detent 203 that is carried by the projecting end of a screw 204 that projects axially of the handle 171.

Operation of the unit just described has been previously described in connection with FIGURES 1 through 4, with rotation of the probing unit 145 being achievable by rotation of the handle 171, while radial variation in the dimension of circle sweep by the probe 145 will be achieved by rotation of handle 176 in the appropriate direction.

With reference to the structure just described, it will be noted that in FIGURES 5 through 10, the arm 175 is mounted eccentrically with respect to the tube 172, with this arrangement being done solely for the purpose of providing clearance for the electrical wire that must be received therein.

Referring now to FIG. 11, it will be noted that a modified form of probing element is provided and in this regard, it will be noted with reference to FIGURE 10 that both the fitting 200 and the connector arm 197 lend themselves to ready detachment from the carrier block 195 so as to facilitate insertion of another contact element such as the contact element 220 shown in FIGURE 11 of the drawings.

Contact element 220 is merely intended to permit a larger diameter bore to be checked and in this regard, a support arm 221 is preferably pivotally secured to this end of the arm 197, while the probing element 198 is pivotally secured to the opposed end of the arm 221 as shown in FIGURE 11.

Also, the arm 221 is shown provided with a series of openings 222, 222 that are intended to reduce the weight of the arm 221 so that its moment around the end of the rod 197 is exactly the same as the moment of the indicator unit 145 shown in FIGURE 10. In this fashion, no greater weight will be placed on the end of the inspection arm by virtue of attaching the inspection probe of FIGURE 11 and thus the sag of the probing element will not be affected by changing of indicator units, which are all attached around the same point and which all are preferably of the same weight so as to avoid any change in moment.

It will be seen from the foregoing, that there has been provided an improved inspection machine that is characterized by the presence of means for compensating for the sag that would otherwise occur at the projecting end of a probing arm. It has been shown how the sag is compensated for in the original mounting of the arm with respect to the column and it has been further shown how the creation of sag is avoided first by preferably mounting the arm on the column at its center of gravity and secondly, by never moving the arm longitudinally of its point of support on the upright column. Thus, the column and the arm are inserted into the hole in unison so that no longitudinal travel of the arm with respect to the column occurs, with the result that the inspection device will never become inaccurate due to shifting of the movement of the probing arm.

While a full and complete description of the invention has been set forth in accordance with the dictates of the patent statutes, it is to be understood that the invention is not intended to be limited to the specific embodiments herein shown.

Accordingly, modifications of the invention may be resorted to without departing from the spirit hereof or the scope of the appended claims.

What is claimed is:

1. An inspection machine for inspecting the bores of a work piece supported on a work supporting surface, comprising;
  (A) a base having an upright column;
  (B) a mounting bracket reciprocal longitudinally of said column;
  (C) an elongate inspection arm
    (1) secured to said bracket in substantially right angle relationship to said column,
    (2) being movable relatively of said column with said bracket while being secured against shifting longitudinally with respect to said bracket,
    (3) having a probing end portion and a control end portion with said probing end portion being disposed at a greater distance from said column than said control end portion;
  (D) a probing element projecting from said probing end portion and being rotatable relatively of said inspection arm around the longitudinal axis thereof and through a plane of rotation normal to the longitudinal axis of said arm at said probing end;
  (E) control means operable from said control end portion for rotating said probing element around said axis of rotation;
  (F) and guide means, operable between said base and said work supporting surface to effectuate transverse and longitudinal movement of said probing element relatively of said work piece.

2. The device of claim 1 further characterized by the fact that said control means shift the projecting end of said probing element through an arc of approximately 180° with respect to the longitudinal axis of said arm.

3. The device of claim 1 further characterized by the presence of means for varying the relative position of said mounting bracket and said arm to compensate for the sag occurring at the probing end portion of said inspection arm whereby said probing element may sweep through a plane that is at right angles to said work supporting surface.

4. The device of claim 1 further characterized by the presence of means for suspending said inspection arm from said column and positioning said axis of rotation of said probing element at right angles to the longitudinal axis of said column notwithstanding the sag which occurs in said inspection arm at the probing end portion thereof while permitting reciprocal movement between said arm and said column.

5. The device of claim 4 further characterized by the fact that said sag compensating means include adjustment screws that adjust the supported portion of said inspection arm with respect to said mounting bracket.

6. The device of claim 1 further characterized by the fact that said control means include selection and indicating means operably connected to said probing element and selectively movable into and out of a series of predetermined positions with said positions corresponding to the position of said probing element whereby the position of said probing element may be determined notwithstanding the fact that said element is inserted in said bore.

7. An inspection machine for inspecting the bores of a work piece supported on a work supporting surface, comprising;
  (A) a base having an upright column;
  (B) a mounting bracket secured to said column for reciprocal movement longitudinally thereof while being secured against movement away from said column;
  (C) an elongate inspection arm
    (1) secured to said bracket in substantially right angle relationship to said column,
    (2) having a probing end portion and a control end portion with said probing end portion being disposed at a greater distance from said column than said control end portion,
    (3) having a support element adapted to support said inspection arm at its approximate center of gravity;
  (D) a control cable interconnecting said support element with said column and effectuating controlled and measured relative movement between said inspection arm and said column;
  (E) a probing element projecting from said probing end portion and being rotatable relatively of said inspection arm around the axis of rotation thereof at said probing end;
  (F) control means operable from said control end portion for rotating said probing element around said axis of rotation;
  (G) and guide means, operable between said base and said work supporting surface to effectuate transverse and longitudinal movement of said probing element relatively of said work piece.

8. An inspection arm of the character described, comprising;
  (A) a support bracket;
  (B) an inspection arm
    (1) supported adjacent one end thereof by said support bracket,
    (2) having a remaining end that projects with respect to said bracket for probing purposes,
    (3) defining an axis of rotation extending longitudinally thereof;
  (C) probe means provided on said probing end of said inspection arm and including
    (1) a contact element that
      (a) projects from the probing end of said inspection arm, and
      (b) rotates around the axis of rotation of said inspection arm at the probing end thereof,
      (c) and rotates through a plane of rotation perpendicular to the axis of rotation of said inspection arm;
  (D) and control means provided on the opposed end of said inspection arm and
    (1) rotating said contact element relatively of said inspection arm around the axis of rotation thereof,
    (2) shifting said contact element radially of said axis of rotation whereby the diameter of the circle of movement thereof around said axis of rotation may be varied.

9. An inspection machine for checking the accuracy of contours on a work piece that is supported on a work surface, comprising;
  (A) an elongate inspection arm;
  (B) means for supporting said inspection arm for three-dimensional relative movement with respect to said work piece while securing said arm to said supporting means against shifting along the longitudinal axis of said arm;
  (C) probing means shiftably carried by one end of said inspection arm for movement about the longitudinal axis of said arm and about an axis of rotation normal to said longitudinal axis of said arm and creating a moment of inertia with respect to the point of support of said inspection arm by said support means,
    (1) said moment of inertia of said probing means remaining constant during three dimensional relative movement between said inspection arm and said work piece.

10. The device of claim 9 further characterized by the fact that said probing means include
  (A) a probing unit support element releasably secured to said arm; and
  (B) an indicator releasably secured to said support element; and
  (C) said probing unit support element being of indeterminate length and being locally lightened inversely to its length so that the weight thereof will remain substantially the same regardless of its length whereby the combined weight of said support element and said indicator will remain substantially the same regardless of the length of said support element and the amount of inertia of said probing means will be substantially identical regardless of the length of said support element.

11. An inspection machine for checking the accuracy of a bore in a work piece supported on a work surface, comprising;
  (A) an elongate inspection arm having a true axis of rotation;
  (B) a probing element carried by said inspection arm in projecting relationship at one end thereof and being rotatable relatively of said arm around an axis of rotation;
  (C) control means operable from the remaining end of said inspection arm and varying the projection position of said probing element by
    (1) rotating the same around the axis of rotation of said inspection arm and through an arc of 180 degrees, and
    (2) varying the diameter of sweep by said probing element;
  (D) and guide means
    (1) supporting said elongate arm for axial insertion into and out of said bores while permitting adjustment of said probing element by said control means.

12. An inspection machine of the character described, comprising;
  (A) a surface table;
  (B) a support column projecting from said table;
  (C) an elongate inspection arm
    (1) having one end thereof slidably connected to said column whereby said arm may move vertically on said column while maintaining right angle relationship therewith;
    (2) overlying said surface table in parallel relationship therewith, and
    (3) being fixed against movement along its longitudinal axis relatively of said column;
  (D) probing means
    (1) carried by said arm at its projecting end, and being moveable relatively of said arm, and
    (2) adapted to inspect the diameter of a bore within which said arm is received;
  (E) control means carried by said arm adjacent its point of connection with said column and moving said probing means relatively of said arm;
  (F) a work supporting surface provided on said surface table;

(G) and first, second and third guide means effectuating three dimensional relative linear movement between said probing means and said work supporting surface with the vertical movement of said arm on said column defining one said guide means.

13. The machine of claim 12 further characterized by fact that said arm is mounted for vertical movement with respect to said column.

14. The device of claim 13 further characterized by the fact that said guide means include a cross slide having right angle guides adapted to guide said column linearly across said surface table.

15. The device of claim 13 further characterized by the fact that said guide means include first and second guide rails
   (A) defined by said surface table;
   (B) being at right angles to each other; and
   (C) respectively guiding said column and said work supporting surface linearly across said surface table.

16. The device of claim 15 further characterized by the fact that said first guide means are parallel to said arm.

17. The device of claim 15 further characterized by the fact that said first guide means are perpendicular to said arm.

References Cited by the Examiner

UNITED STATES PATENTS

| | | | |
|---|---|---|---|
| 1,416,694 | 5/1922 | De Leeuw | 33—178 |
| 2,354,414 | 7/1944 | Walter | 77—3 |
| 2,359,018 | 9/1944 | Balk | 33—174 |
| 2,456,383 | 12/1948 | Collins | 33—172 |
| 2,724,185 | 11/1955 | Harra | 33—143 |
| 2,770,045 | 11/1956 | Oliva | 33—178 |
| 3,097,568 | 7/1963 | Kampmeier | 77—3 |
| 3,100,346 | 8/1963 | Cannon | 33—169 X |

FOREIGN PATENTS 915,226   1/1963   Great Britain.

LEONARD FORMAN, *Primary Examiner.*

S. S. MATTHEWS, *Assistant Examiner.*